United States Patent
Moore et al.

(10) Patent No.: US 12,223,981 B2
(45) Date of Patent: Feb. 11, 2025

(54) VINYL RECORD WITH INTEGRATED AUTHENTICITY

(71) Applicant: Citizen Digital Inc., Asheville, NC (US)

(72) Inventors: Sean Moore, Asheville, NC (US); Peter Schaper, Asheville, NC (US)

(73) Assignee: Citizen Digital Inc., Asheville, NC (US)

( * ) Notice: Subject to any disclaimer, the term of this patent is extended or adjusted under 35 U.S.C. 154(b) by 15 days.

(21) Appl. No.: 17/816,868

(22) Filed: Aug. 2, 2022

(65) Prior Publication Data

US 2023/0032976 A1    Feb. 2, 2023

Related U.S. Application Data (60) Provisional application No. 63/228,375, filed on Aug. 2, 2021.

(51) Int. Cl.

| | |
|---|---|
| *G11B 19/12* | (2006.01) |
| *G11B 23/28* | (2006.01) |
| *B29D 17/00* | (2006.01) |

(52) U.S. Cl.
CPC ............ *G11B 19/12* (2013.01); *G11B 23/284* (2013.01); *B29D 17/002* (2013.01)

(58) Field of Classification Search
CPC ........... G11B 23/284; G11B 3/00; G11B 3/68; G11B 3/74; B29D 17/002
USPC ......................................................... 264/107
See application file for complete search history.

(56) References Cited

U.S. PATENT DOCUMENTS

| | | | |
|---|---|---|---|
| 5,289,280 A * | 2/1994 | Nomura | H04N 7/18 |
| | | | 348/335 |
| 10,802,798 B1 | 10/2020 | Chiang | |
| 2004/0238623 A1* | 12/2004 | Asp | B29C 45/14811 |
| | | | 235/491 |
| 2006/0028344 A1 | 2/2006 | Forster | |
| 2006/0132309 A1 | 6/2006 | Posamentier | |
| 2008/0103944 A1* | 5/2008 | Hagemann | B65D 19/004 |
| | | | 108/51.11 |
| 2017/0330199 A1 | 11/2017 | Klint | |

(Continued)

FOREIGN PATENT DOCUMENTS

WO         2019012207 A1    1/2019

*Primary Examiner* — S. Behrooz Ghorishi
*Assistant Examiner* — Gregory C. Grosso
(74) *Attorney, Agent, or Firm* — The Van Winkle Law Firm; William G. Heedy (57) ABSTRACT

A record (100) may include a disk (102), an embedded electronic authentication tag (104), a cover (106) between the disk and the electronic authentication tag, and one or more record labels (108A, 108B). The disk, electronic authentication tag, and cover have a spindle hole (114) and a common centerline (116). The electronic authentication tag contains a unique identification code pointing to information regarding the record stored as a non-fungible token. This information may be used to verify the authenticity and ownership of the record. A puck used to create the disk may include segments of different colors so that, when the record is pressed the different segments produce a visual pattern unique to that record. A picture may be taken after pressing, recorded, recorded as part of the information in the non-fungible token, and later used to verify the authenticity of the record.

5 Claims, 8 Drawing Sheets

(56) References Cited

U.S. PATENT DOCUMENTS

| | | |
|---|---|---|
| 2019/0134964 A1 | 5/2019 | Musa et al. |
| 2021/0174378 A1 | 6/2021 | Rahimizad et al. |
| 2021/0283872 A1* | 9/2021 | Brown .................... B29C 43/02 |
| 2023/0031817 A1* | 2/2023 | Mulas ................... G06Q 20/208 |
| 2023/0360669 A1* | 11/2023 | Kaufmann ............... G11B 3/72 |

* cited by examiner

VINYL RECORD WITH INTEGRATED AUTHENTICITY

CROSS REFERENCE TO RELATED APPLICATIONS

The present application claims the priority of U.S. Provisional Patent Application Ser. No. 63/228,375 filed Aug. 2, 2021, entitled "VINYL RECORD WITH INTEGRATED AUTHENTICITY", and which is incorporated herein in its entirety.

SUMMARY

A record has a disk and an authentication tag, the authentication tag being embedded within the disk and having stored therein certain information related to the record.

A method for making a record includes encoding an authentication tag with certain information relating to the record, providing a desired material for the disk, providing an elastic material by heating the desired material, aligning the authentication tag, the elastic material, and a pair of stampers, the authentication tag and the elastic material being between the stampers, each stamper having information tracks for the record on the surface thereof, forcing the stampers together, wherein the information tracks are impressed on the elastic material and the authentication tag is embedded in the elastic material, cooling the elastic material to provide a record, and removing the record from the stampers.

A method of identifying an object includes storing non-fungible token information and a for the object as a data entry, for example, a blockchain data entry, assigning a first identification code to the data entry, the first identification code being unique to the data entry, receiving a query, the query including a second identification code, determining that the second identification code is the same as the first identification code, retrieving the data entry corresponding to the first identification code, and sending a reply to the query, the reply including at least one of the non-fungible token information.

DETAILED DESCRIPTION

When limited editions, such as collectors' editions, of records are made, such as vinyl records, counterfeiting can be an immediate problem. Making a copy of a record and a label are simple tasks and determining whether a record is a valued original or a worthless copy can be difficult or even impossible. Even a serial number on a record can be copied or new serial numbers generated to make a copy even harder to detect. Counterfeiting can lead to people paying substantial money to a limited edition, only to later find they have bought a worthless copy. Counterfeiting can also lead to diminution of the value of the real items due to an inability to tell whether a record is an original or a copy.

A record with integrated authenticity, and a method for making same, are disclosed herein. The record may include a disk, an embedded authentication tag, an embedded visual pattern, at least one label, and/or a unique identification code on the label.

Also, a method for authenticating a purchase or transfer of an original record is disclosed herein. The method includes a non-fungible token, a registration code, and one or more pictures of the record.

Also, a method for identifying an object is disclosed herein. The method includes a non-fungible token, a visual pattern, and a registration code for the object.

Figure 1:
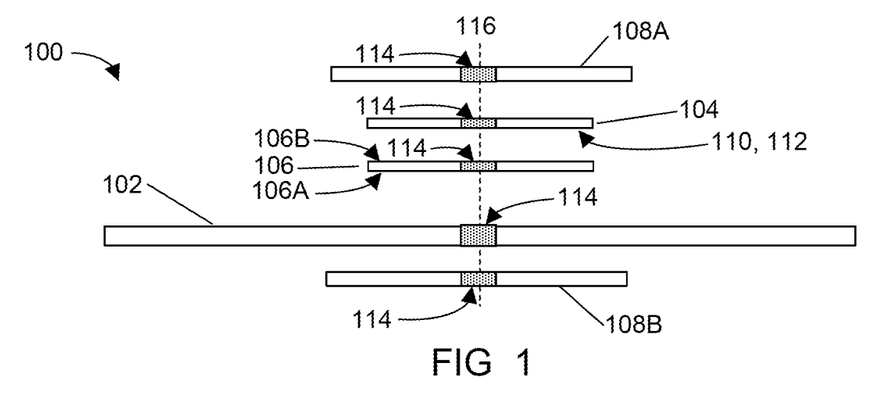
FIG. 1 is an exploded view illustration of a record.
Figure 2:
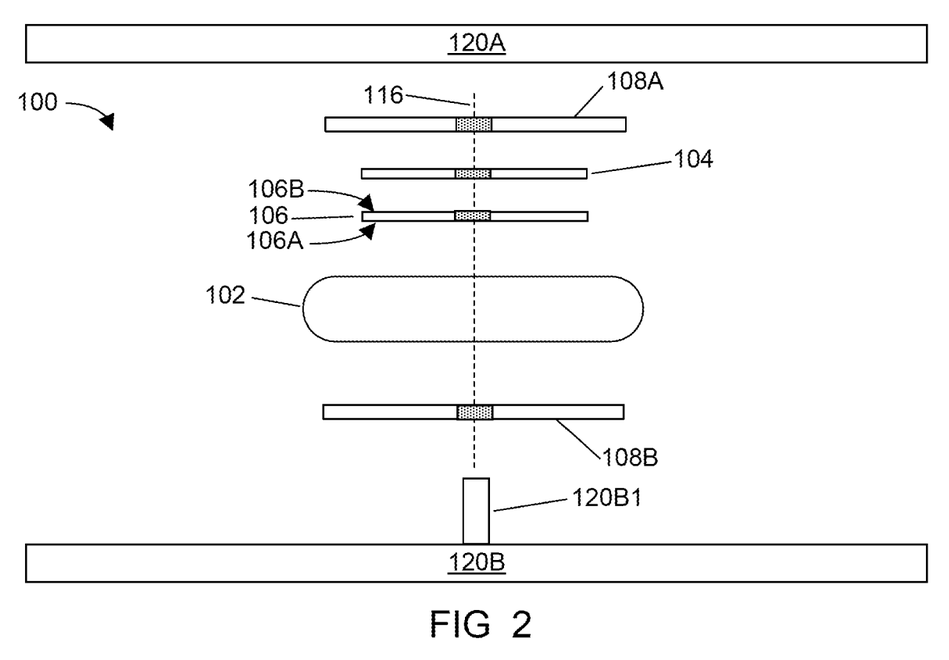
FIG. 2 is an illustration of various components of the record prior to pressing.

FIG. 1 is an exploded view illustration of a record 100 and FIG. 2 is an illustration of the various components of the record 100 prior to pressing, including the vinyl "biscuit" or "puck" 102 which will become the disk 102 after pressing. The record 100 has a disk 102, such as a vinyl disk, an electronic authentication tag 104, a cover 106 between the disk 102 and the authentication tag 104, and one or more record labels 108A, 108B.

In an embodiment, the electronic authentication tag 104 is a Near Field Communication (NFC) tag. In alternative embodiments, the electronic authentication tag 104 can be any electronic device which can be embedded within the record 100, and which will allow reading of the information 110 contained therein from a position on, or external to, the record 100. For convenience of discussion herein, the electronic authentication tag 104 may subsequently be referred to herein as a tag 104.

One side 106A of the cover 106 adheres to the disk 102 and the other side 106B of the cover 106 adheres to the tag 104. In an implementation, side 106A includes a material, such as a heat sensitive bonding material or heat sensitive bonding promoter, which adheres to the disk 102, and side 106B includes an adhesive, such as a silicone based, heat stabile adhesive, which adheres to the tag 104. This holds the tag 104 so that it does not slip out of alignment during the pressing process. The material on one side 106A may be, if desired, the same as the material on the other side 106B. In addition to holding the tag 104 in place on the disk 102 during pressing of the disk 102, the cover 106 also protects the tag 104 during the pressing process.

In an alternative implementation, a material, such as paper or polyamide film, is placed between the tag 104 and the label 108, primarily to protect the tag 104 and improve the adherence between the carrier film of the tag 104 and the PVC of the record 102, and also to hold the tag 104 in place on the label 108 so that the tag 104 does not slip out of alignment during the pressing process.

In an implementation, the tag 104 is under the back side of a record label 108 so that the tag 104 does not cover, obscure, or reduce the area available for, information about the record 100, such as the record name, the artist, the songs on the various tracks, the duration of the various songs or the record, etc.

The tag 104 has certain desired information 110 encoded therein, and the tag 104 is locked after the desired information 110 has been encoded therein. "Encoded" includes, but does not require, any compression and/or encryption desired for a particular application and/or level of security. The tag 104 may also have an included tag identification code programmed into it by the manufacturer. The desired information 110 includes a unique identification code (UIC) 112, which is a link or a pointer to a Non-Fungible Token (NFT) 118. In an embodiment, the unique identification code (UIC) 112 may include the tag identification code. The NFT 118 is a token which may be unique to a particular record, may be unique to a particular set of records, or may be unique to a particular series of records, e.g., a limited edition of a record, set of records, or series of records. In an embodiment, the NFT 118 is stored as a data entry on an electronic ledger system 1000 (see FIG. 10), preferably a secured electronic ledger system, such as a blockchain system.

The tag 104, bearing the unique identification code 112, is integrated into the record 100 at the time of manufacture of the record. In an implementation, the tag 104, and the labels 108, are circular in shape and have a spindle hole 114 along the centerline 116 to accommodate a spindle in a record player.

The tag 104 may be under the "A" side label 108A or under the "B" side label 108B, as desired.

As the record 100 is being made and the record labels 108 are being impressed into the disk 102, the tag 104 becomes embedded within the disk 102 and therefore becomes an integrated part of the record 100.

In an implementation, the unique identification code 112 is encoded in the tag 104 prior to the tag 104 being embedded within the disk 102. The tag 104 is then locked so that it cannot be written on again or modified.

In an implementation, the unique identification code 112 is encoded in the tag 104 after the record 100 has been made. The tag 104 is then locked so that it cannot be written on again or modified.

FIG. 2 also shows the stampers 120A, 120B of a conventional vinyl record stamping machine (not shown) and also shows the vinyl biscuit 102 which will become the record 102 after stamping. Also shown is a spindle 120B1 which makes the spindle hole 114 in the vinyl biscuit 102. Although spindle 120B1 is shown on stamper 120B, it could be on stamper 120A if desired. Preferably, but not necessarily, the tag 104, the cover 106, and the labels 108A, 108B have the spindle holes 114 in them prior to being placed between the stampers 120.

Figure 3:
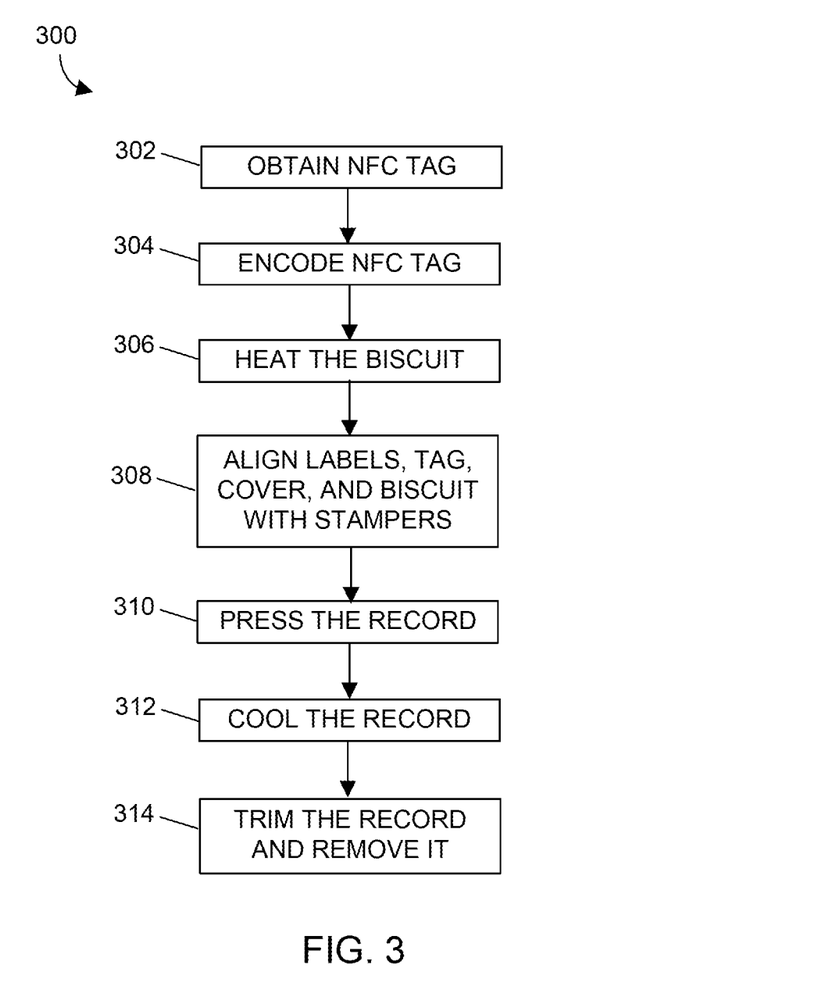
FIG. 3 illustrates a method of manufacturing a vinyl record with an integrated authentication tag.

FIG. 3 illustrates a method 300 of manufacturing a vinyl record with an integrated authentication tag. A tag 104 is manufactured or obtained 302 from another party. The tag 104 is then encoded 304 with the desired information 110, including the unique identification code 112.

The vinyl material is obtained, i.e., the vinyl biscuit 102, is then heated 306 so that it is elastic.

The labels 108A 108B, the tag 104, the cover 106, the biscuit 102, and the stampers 120 are then aligned 308 along the centerline 116.

The record 100 is pressed 310 by forcing the stampers 120 together to mash the biscuit 102 into a vinyl record 100. The pressing operation impresses the sound tracks onto the disk 102 and also integrates the labels 108, tag 104, and cover 106 into the record 100.

The record 100 is then cooled, 312, which fixes the sound information, labels 108, tag 104, and cover 106 into the record 100.

The record 100 is then trimmed and removed 314 from the stampers 120. In an implementation, the record 100 is also inspected, visually or by machine, for defects.

In an embodiment, the unique identification code 112 is written onto one or both labels 108. If the interested person does not have a smartphone or device which is capable of reading the tag 104 to retrieve the information in the NFT 118, the person may directly enter the unique identification code 112 at a website to retrieve the information.

Figure 8:
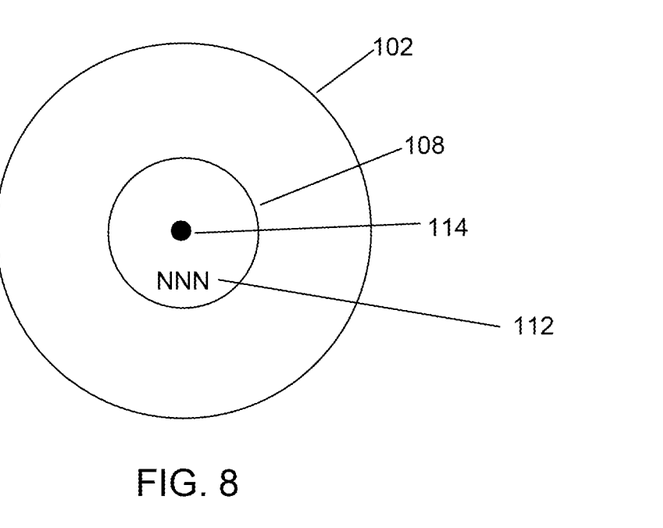
FIG. 8 is an illustration of a record with a label designed with space for a unique identification code.

In an embodiment, as shown in FIG. 8, the label 108 is designed with space for the unique identification code 112, and the unique identification code 112 may be laser engraved into the label 108.

In an implementation, the biscuit 102 may, in addition to a base color vinyl, include one or more pieces ("sprinkles") of vinyl having different colors. This produces a visually distinct pattern which may be called a "splash pattern", a "splatter pattern", or a "whirl" in the industry. For convenience of discussion, a visually distinct pattern is referred to herein simply as a "visual pattern."

Figure 4:
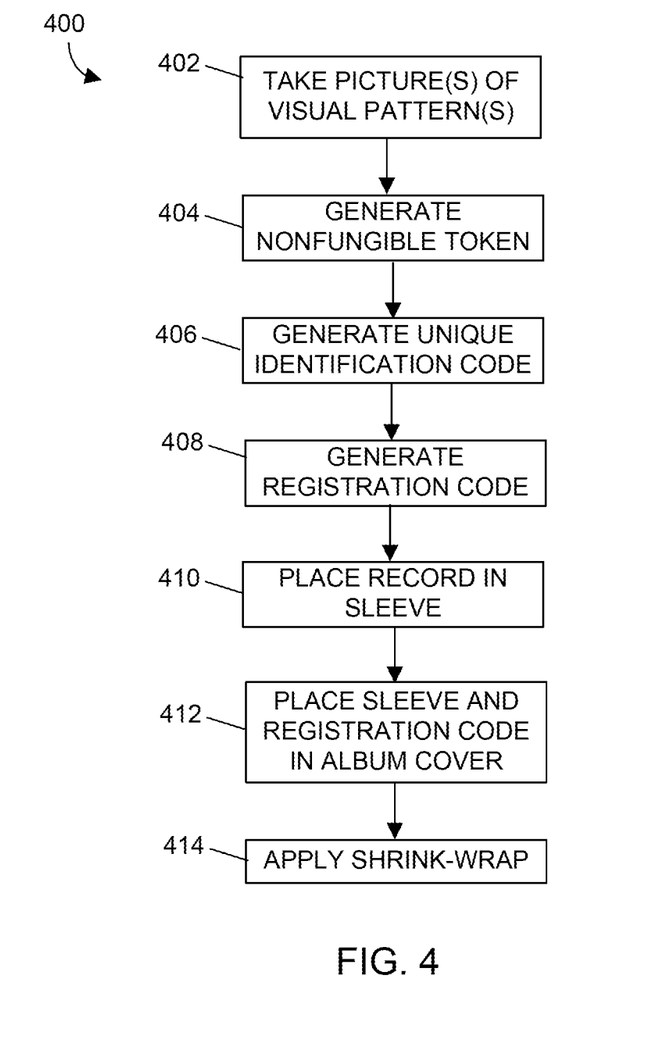
FIG. 4 illustrates a process for authenticating a record.

FIG. 4 illustrates a process 400 for authenticating the particular record. After the record 100 has been manufactured, such as discussed above with respect to FIG. 3, then a picture is taken 402 of the visual pattern on one side (front or back). In an implementation, there are at least two pictures: one of the visual pattern on the front side and another of the visual pattern on the back side. There may be more pictures if there are two or more albums in a particular set or package.

The NFT 118 is generated 404 for the record, set, or collection. The NFT 118 preferably contains information such as the visual pattern(s), author(s), song(s), tag 104 identification information, ownership information, and ownership history. The NFT 118 may also contain other desired information.

The unique identification code 112 is generated for the NFT 118.

A registration code 504 is generated 408 for the corresponding NFT 118. In an implementation, the registration code 504 is printed and placed in a pressure sealed envelope, such as used for tax forms, bank items, and other valuable documents. To obtain the registration code 504 the shrink-wrap will need to be opened and the envelope opened. Preferably, the registration code 504 is printed at the same time as, or approximately the same time as, the tag 104 is programmed.

The record 100 is placed 410 in a sleeve.

The sleeve, with the record 100 inside it, and the printed registration code 504, are placed 412 in the album cover.

A protective wrap, such as shrink-wrap, is then applied 414 to the album cover, thereby sealing the record 100 and the registration code 504 inside the album cover.

Figure 5:
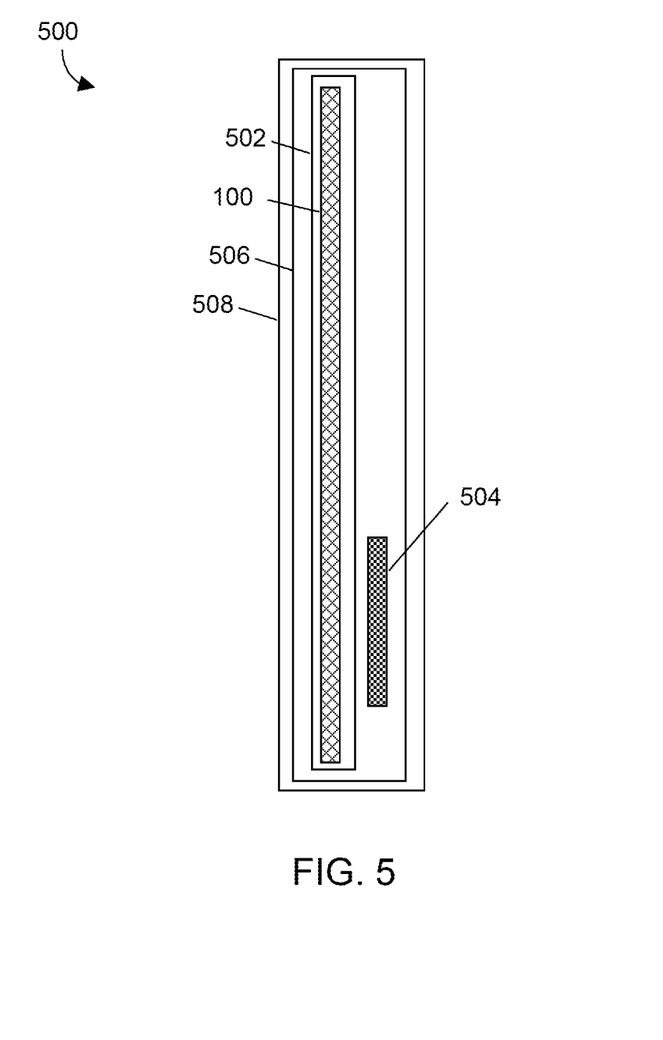
FIG. 5 is an exploded view showing a record, a sleeve, a printed registration code, album cover, and a shrink-wrap.

FIG. 5 is an exploded view 500 of record 100, sleeve 502, printed registration code 504, album cover 506, and shrink-wrap 508.

Figure 6:
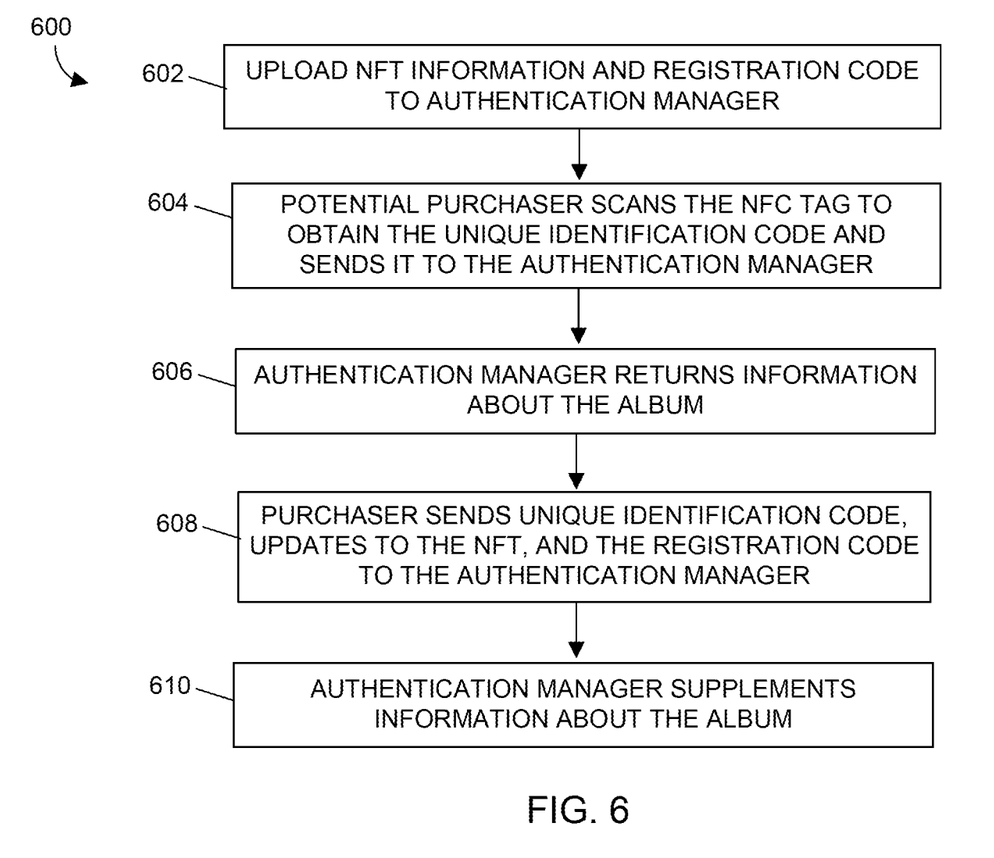
FIG. 6 illustrates a process for use of a non-fungible token, a visual pattern, and a registration code.

FIG. 6 illustrates a process 600 for use of the NFT 118 and registration code. The NFT 118 and registration code 504 are uploaded 602 to an authentication manager 1010 (see FIG. 10) which generates the unique identification code 112 for the NFT 118. The unique identification code 112, as mentioned elsewhere herein, is stored in the tag 104.

A potential purchaser, before buying an album, scans 604 the tag 104 to obtain the unique identification code 112 for the NFT 118, such as by using a smartphone which can read an NFC tag, an NFC tag scanner and a computer, or other desired means of reading the tag 104 to obtain the unique identification code 112. The smartphone sends the unique identification code 112 to the authentication manager 1010 to obtain information about the album stored as the non-fungible token 118. It should be noted that the tag 104 can be scanned to obtain the unique identification code 112 without breaking the shrink-wrap. As noted above, the unique identification code 112 may also be printed on the record in a manner which allows it to be viewed, entered, and sent to the authentication manager 1010 to obtain the NFT 118 information.

The authentication manager 1010 returns 606 information to the smartphone, such as whether the NFT 112 is valid, whether the album has been previously registered, the visual pattern(s), the author(s), the title(s), etc., If the information is satisfactory to the potential purchaser then the potential purchaser may choose to purchase the album.

In an implementation, the purchaser, formerly the potential purchaser, then breaks the shrink-wrap to obtain the registration code, scans the tag 104, and sends 608, to the authentication manager 1010, the unique identification code 112 for NFT 118, the registration code 504, and updates to the NFT 118, such as purchaser information, or "wallet information" in Ethereum™.

In an implementation, after the purchaser scans the tag 104, the authentication manager 1010 presents a web page displaying the visual pattern first uploaded to the authentication manager 1010. In an implementation the purchaser compares the visual pattern of the record 100 just obtained to the visual pattern first uploaded to verify that the record 100 is authentic.

In another implementation, the purchaser also takes a picture of the visual pattern on one or both sides of the record 100 and also sends 608 the picture(s) to the authentication manager 1010. The authentication manager 1010 uses photo image recognition software to perform a comparison between the picture(s) and the visual pattern first uploaded, and provides a report listing the results of the comparison to the smartphone.

In an implementation, if the authentication manager 1010 displays the visual pattern to a purchaser or a potential purchaser, the displayed visual pattern is at a resolution less than the visual pattern first uploaded. This resolution is still satisfactory for inspection by the purchaser or potential purchaser, but a copy or photo of the displayed visual pattern will not have the resolution of the visual pattern first uploaded. This reduces the likelihood of someone being able to use a copy of the displayed visual pattern to be able to thwart the authentication manager 1010.

If the unique identification code 112 and the registration code match then the authentication manager 1010 updates or supplements 610 the NFT 118 information about the record 100, such as to identify the purchaser as the first owner or a new owner.

Thus, the album has been verified as authentic, and the owner has been registered. The owner may then, if desired, re-sell the record 100 as the authenticity has been verified. A subsequent potential purchaser can then scan the tag 104 and send the unique identification code 112 information to obtain current information about the record 100 before purchasing the record 100.

In an implementation, the authentication manager 1010 is an Ethereum™ contract manager.

In an implementation, the NFT 118 is created on an Ethereum blockchain as a ERC721 smart contract with the data of the 104 and the picture(s) of the visual patterns. The blockchain includes an identification of NFT 118 or a link to the NFT 118.

In an implementation, data for all pressed records 100, such as the picture(s) and tag 104 information for each record 100, is bundled as a collection, and that data bundle is used to create an Ethereum contract for the collection of records 100. An NFT 118 is mapped in that contract for each record 100, and that NFT 118 is non-fungible because of the associated information from the tag 104 and the visual pattern(s). The NFT 118 may also contain additional data, if desired, such as a picture of the artist, a video showing the manufacture of the vinyl record.

Figure 7:
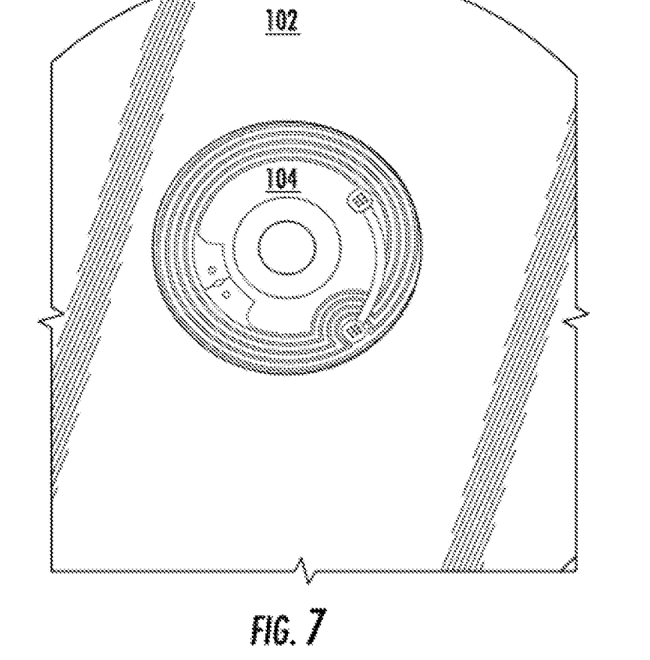
FIG. 7 is an illustration of an electronic authentication tag embedded within a record.

FIG. 7 is an illustration of tag 104 embedded within the record 100, but without the labels 108.

Although the discussion above refers to a record 102, such as a vinyl record, in an implementation the tag 104, the unique identification code 112, and the NFT 118 may be used with other items where the tag 104 may be permanently attached to or embedded with an object, such as a Compact Disk ("CD") or a Digital Video Disc or Digital Versatile Disc ("DVD").

Although the discussion above refers to use with a registration code 504, in an implementation a registration code 504 is not included with the record 102. For example, an artist conducts an auction or a contest, and then sends the winner(s) the album, such as by mail or a delivery service. The artist may include a link to the NFT 118 with the album, or may send, such as by text message, email, or letter, a link to the NFT 118. The winner can then proceed to register ownership of the record 102.

Figure 9:
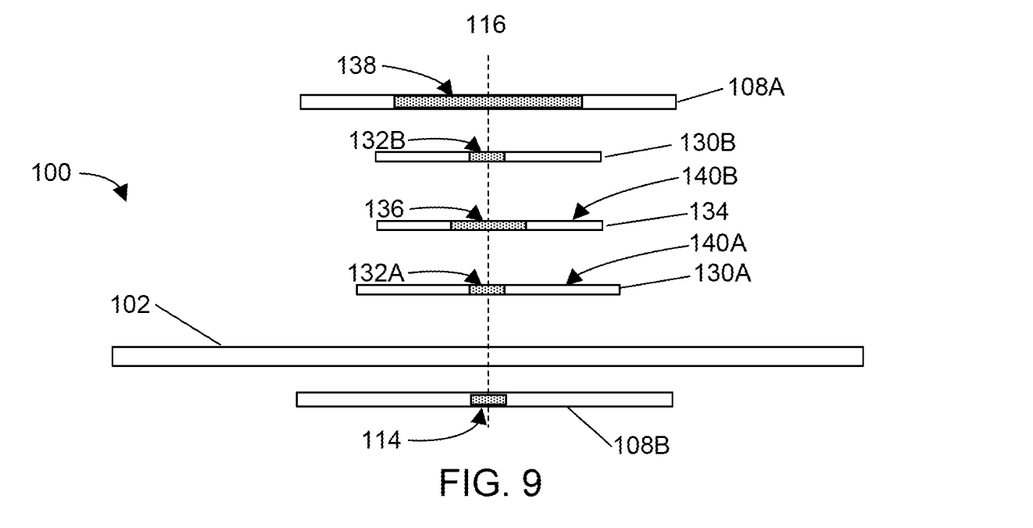
FIG. 9 is an exploded view illustration of another embodiment of a record.

FIG. 9 is an exploded view illustration of another embodiment of a record 100. The record 100 comprises a disk 102, labels 108A, 108B, clear Mylar™ films 130A, 130B having spindle holes 132A, 132B, respectively, and an authentication tag 134 having a hole 136, and between the films 130A, 130B. The hole 136 may be a spindle hole but is preferably larger. The antenna, and preferably also the associated electronics of the tag 134, are positioned facing toward the label 108A, that is, away from the disk 102.

Film 130A and tag 134 preferably each have a thin layer of glue 140A, 140B, respectively, such as an acrylic adhesive, on their top surfaces so that films 130A, 130B, and tag 134 bind together as a single component.

Label 108A has either a large hole or a transparent area 138, and the film 130B is transparent, so that a person may view the tag 134.

This implementation allows a person to know where the NFC tag 134 is located so that a person will know where to place a smartphone which can read an NFC tag, an NFC tag scanner, or other desired means of reading the NFC tag 134, so as to obtain the unique identification code 112 in the tag 134.

Figure 10:
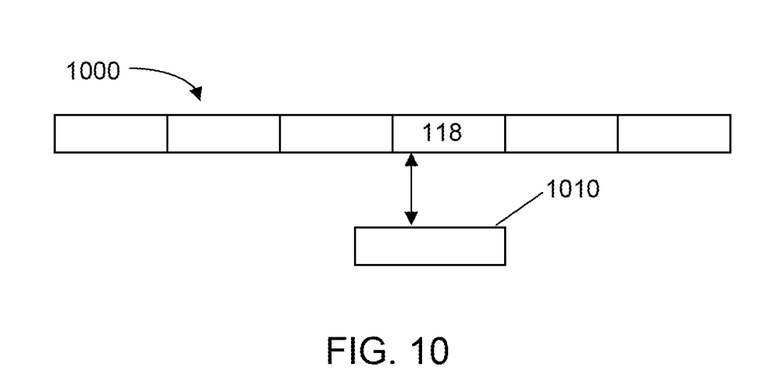
FIG. 10 is an illustration of an electronic ledger system having a non-fungible token, and an authentication manager.

FIG. 10 is an illustration of an electronic ledger system 1000 having an NFT 118, and an authentication manager 1010.

Figure 11:
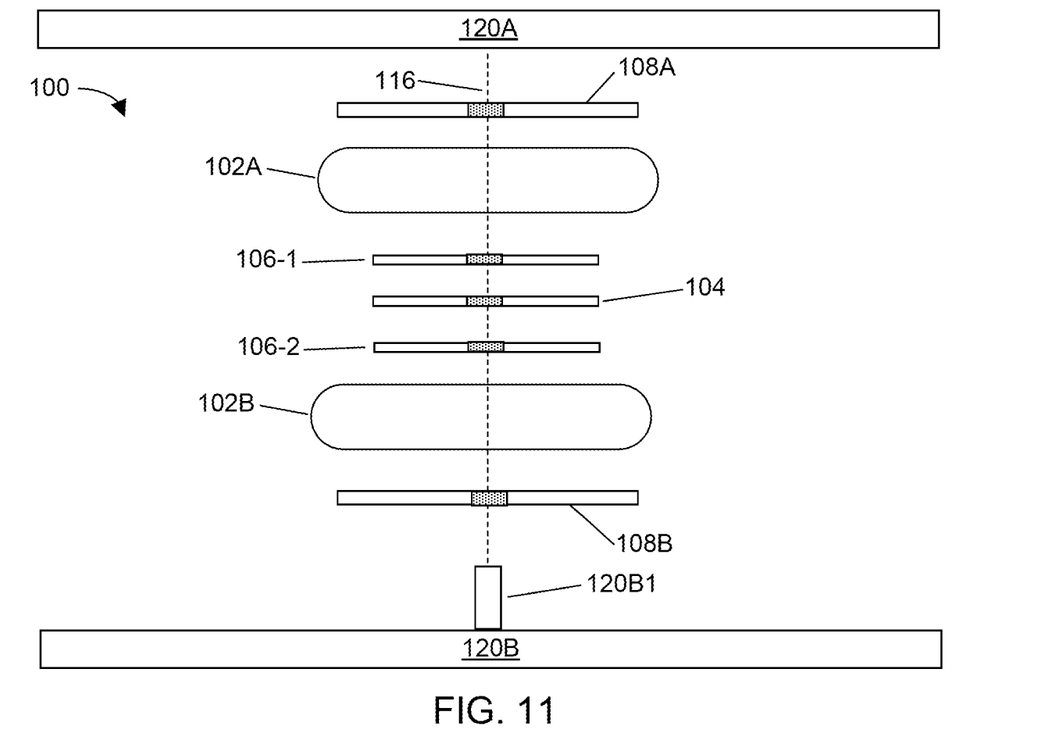
FIG. 11 is an illustration of an alternative embodiment of a record prior to pressing.

FIG. 11 is an illustration of an alternative embodiment of a record 100 prior to pressing. in this embodiment, two pucks 102A, 102B are used, each having approximately one-half the volume of the single puck 102 of FIG. 2. This results in the tag 104 being completely embedded in the record 100.

The two pucks 102A, 102B may be the same color, may be different colors, may not have a splash pattern, may have a splash pattern for only one puck, or may have a splash pattern for both pucks.

Preferably, but not necessarily, two covers, 106-1, 106-2 are used, one on each side of the tag 104. Clear Mylar™ films 130A, 130B, such as shown in FIG. 9, may also be used, if desired, instead of the covers 106-1, 106-2.

In an embodiment, label 108A has a diameter of approximately 100 mm, and the hole 138 has a diameter of approximately 38 mm.

In an embodiment, films 140A and 140B each have a thickness of approximately 5 mm, film 140A has a diameter of approximately 46 mm, and film 140B has a diameter of approximately 38 mm.

In an embodiment, tag 134 has a diameter of approximately 38 mm.

It will be appreciated that the thicknesses and other dimensions of tags 104, 134, cover 106, labels 108, and films 130 are preferably selected to meet current record industry specifications for vinyl records so as to assure compatibility and playability of the vinyl records.

The various implementations disclosed herein therefore address problems of counterfeiting, authenticity, proof of ownership, proof of rarity/scarcity, and provenance.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations may be well known in the art, and because they do not facilitate a better understanding of the present disclosure, a discussion of such elements and operations is not provided herein. The present disclosure is deemed to inherently include all such elements, variations, and modifications to the described aspects that would be known to those of ordinary skill in the art, particularly in view of reading the present disclosure. Any headings used herein are for organizational purposes only and are not meant to be used to limit the scope of the description or the claims.

The terminology used herein is for the purpose of describing particular example embodiments or implementations only and is not intended to be limiting. As used herein, the singular forms "a", "an", and "the" may be intended to include the plural forms as well, unless the context clearly indicates otherwise.

The terms "comprises," "comprising," "includes," "including," "has," "having," and variations in form thereof are inclusive or variations in form thereof are intended to be inclusive in a manner similar to the term "comprises" as that term is interpreted when employed as a transitional word in a claim, and therefore specify the presence of stated features, integers, steps, operations, elements, and/or components, but do not preclude the presence or addition of one or more other features, integers, steps, operations, elements, components, and/or groups thereof unless explicitly stated otherwise or the context clearly requires otherwise.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments and implementations.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments and implementations are contemplated, described herein, and set forth in the claims.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

The terms "includes," "has," "having," or "exhibits," or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items.

As used herein, phrases such as "between X and Y" and "between about X and Y" should be interpreted to include X and Y unless expressly stated otherwise or the context clearly indicates otherwise.

Terms such as "about", "approximately", "around", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While terms such as vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments and implementations preferably or optionally include certain features, elements and/or steps, while some other embodiments and implementations optionally do not include those certain features, elements and/or steps. Thus, such conditional language indicates, in general, that those features, elements and/or steps are used in a permissive sense rather than a mandatory sense, and may not be required for every implementation or embodiment.

The subject matter described herein is provided by way of illustration only and should not be construed as limiting the nature and scope of the claims herein. While different embodiments and implementations have been provided above, it is not possible to describe every conceivable combination of components or methodologies for implementing the disclosed subject matter, and one of ordinary skill in the art may recognize that further combinations and permutations that are possible. Furthermore, the nature and scope of the claims is not necessarily limited to implementations that solve any or all disadvantages which may have been noted in any part of this disclosure. Various modifications and changes may be made to the subject matter described herein without departing from the spirit and scope of, the exemplary embodiments, implementations, and applications illustrated and described herein.

Although the subject matter presented herein has been described in language specific to components used therein, it is to be understood that the scope of the claims is not necessarily limited to the specific components or characteristics thereof described herein; rather, the specific components and characteristics thereof are disclosed as example forms of implementing the disclosed subject matter. Accordingly, the disclosed subject matter is intended to embrace all alterations, modifications, and variations, that fall within the scope and spirit of any claims included herein or that may be written.

The foregoing Detailed Description is intended only to convey to a person having ordinary skill in the art the fundamental aspects of the disclosed subject matter and is not intended to limit, and should not be construed as limiting, the scope of any claims. Further, in the foregoing Detailed Description, various features may be grouped together in a single embodiment or implementation for the purpose of streamlining the disclosure. This method of disclosure is not to be interpreted as reflecting an intention that a claimed embodiment, implementation, or application requires more features than are expressly recited in a claim. Rather, claims reflect patentable subject matter which may lie in less than all features of a single disclosed embodiment, implementation, or application. Thus, all claims which may be present herein are hereby incorporated into the Detailed Description, with each claim standing on its own as a separate embodiment, implementation, or application.

The invention claimed is:

1. A method for making a record, comprising:
   encoding an electronic authentication tag with certain information relating to the record;
   providing a desired material, wherein providing the desired material comprises providing a material having a plurality of different colors;
   providing an elastic material by heating the desired material;
   aligning the electronic authentication tag, the elastic material, and a pair of stampers, the electronic authentication tag and the elastic material being between the stampers, each stamper having information tracks on the surface thereof;
   forcing the stampers together, wherein the information tracks are impressed on the elastic material and the electronic authentication tag is embedded in the elastic material, and forcing the stampers together spreads the different colors to produce a visual pattern;
   cooling the elastic material to provide the record;
   removing the record from the stampers;
   taking a picture of the visual pattern;
   generating a registration code for the record; and
   associating the registration code and the visual pattern.

2. The method of claim 1 and further comprising:
   printing the registration code to provide a printed registration code;
   placing the record in a sleeve;
   placing the sleeve and the printed registration code in an album cover; and
   applying a protective wrap to the album cover.

3. The method of claim 1 and further comprising locking the electronic authentication tag after the certain information is encoded thereon.

4. The method of claim 1 wherein the certain information comprises a unique identification code, the unique identification code being a link to a Non-Fungible Token (NFT).

5. The method of claim 4 wherein the NFT is unique to one of: a particular record, a particular set of records, a particular series of records, a limited edition of a record, a set of records, or a series of records.

* * * * *